(12) United States Patent
Steinich

(10) Patent No.: US 6,499,225 B1
(45) Date of Patent: Dec. 31, 2002

(54) MEASURING CABLE-PATH SENSOR

(75) Inventor: Klaus-Manfred Steinich, Poering (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 41 days.

(21) Appl. No.: 09/711,893

(22) Filed: Nov. 15, 2000

(30) Foreign Application Priority Data

Nov. 16, 1999 (EP) .............................................. 99122778

(51) Int. Cl.[7] ................................................. G01B 3/10
(52) U.S. Cl. ........................................... 33/756; 33/761
(58) Field of Search ........................ 33/732, 733, 755, 33/756, 761, 762, 763, 769

(56) References Cited

U.S. PATENT DOCUMENTS

| | | | | |
|---|---|---|---|---|
| 4,286,386 A | * | 9/1981 | Long ............................ | 33/755 |
| 4,653,190 A | | 3/1987 | Spain, Jr. ..................... | 33/732 |
| 5,236,144 A | | 8/1993 | Kautz .......................... | 242/107 |
| 5,761,822 A | | 6/1998 | Steinich ........................ | 33/756 |
| 6,154,975 A | * | 10/2000 | Steinich ........................ | 33/755 |
| 6,168,107 B1 | * | 1/2001 | Bishop et al. ................. | 33/756 |
| 6,347,462 B1 | * | 2/2002 | Steinich ........................ | 33/755 |

FOREIGN PATENT DOCUMENTS

| | | |
|---|---|---|
| DE | 297 07 253 | 8/1997 |
| EP | 0 393 892 | 10/1990 |
| EP | 0 745 829 | 12/1996 |
| GB | 1194558 | 6/1970 |

* cited by examiner

Primary Examiner—Christopher W. Fulton
(74) Attorney, Agent, or Firm—Crowell & Moring LLP

(57) ABSTRACT

A measuring cable travel sensor comprises a measuring cable, and a cable drum for winding on and off the measuring cable. A spiral spring is arranged non-rotatably with the cable drum coaxially therewith, on the rotary trunnion of a rotary angle sensor for sensing rotation of the cable drum. The cable drum and the spiral spring are disposed in a housing which forms at least one mechanical internal space for same. The housing has at least two flat outside surfaces which are a right angle to each other. The housing parts are in the form of plastic injection moldings, and the sensor can be assembled very easily and quickly. The external configuration of the housing makes it possible to afford very many different possible ways of fixing it in position relative to the surrounding structure. The sensor is assembled by a method affording simplicity and speed.

18 Claims, 9 Drawing Sheets

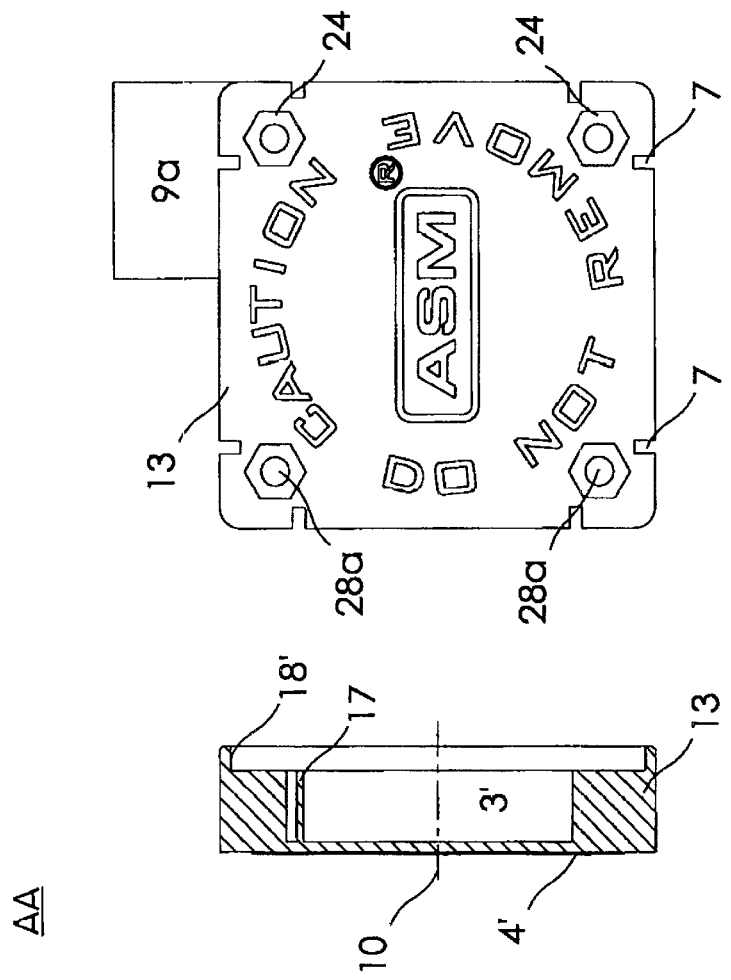
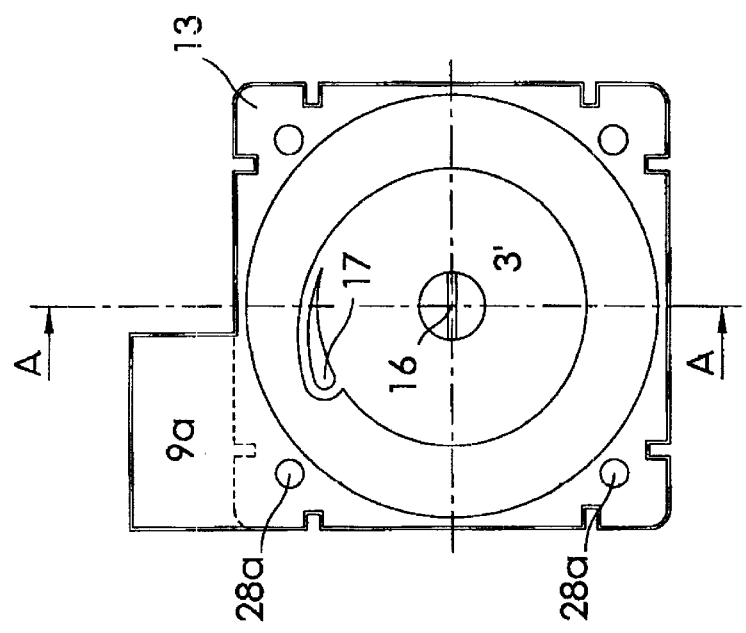
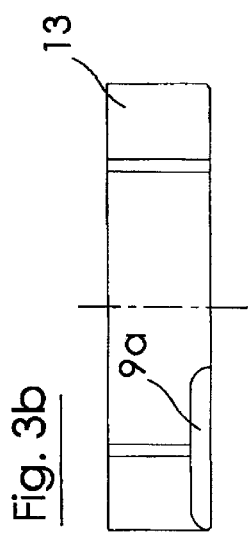

AA

AA

36

Fig. 9b
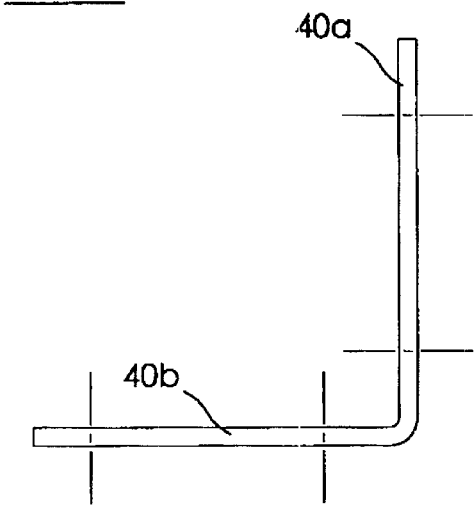
Fig. 9a
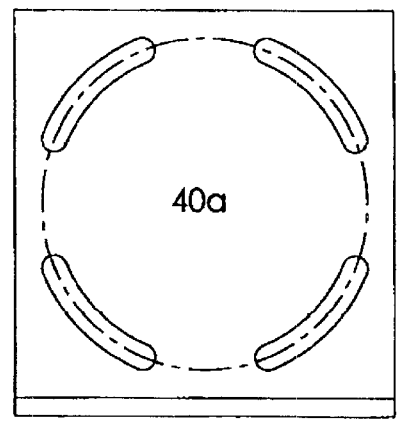
Fig. 9c
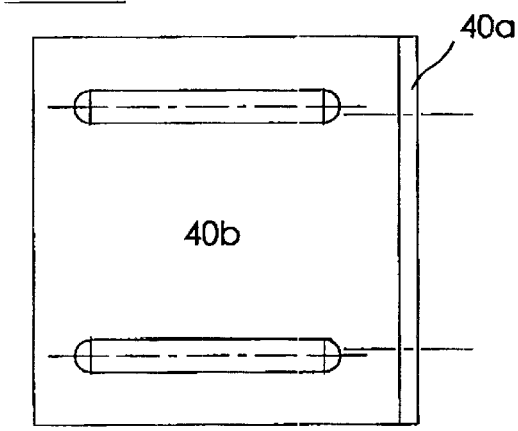
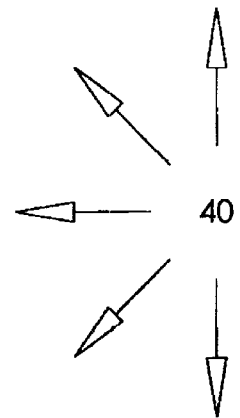
Fig. 9d
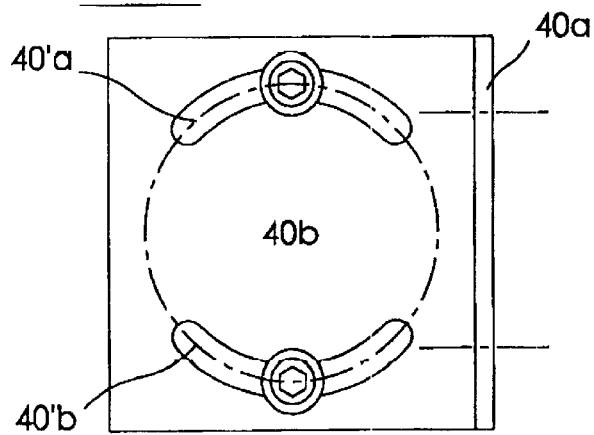
Fig. 9e
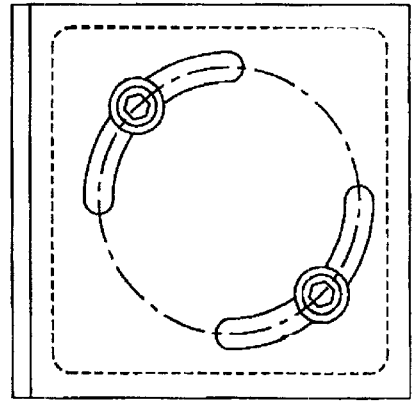

MEASURING CABLE-PATH SENSOR

FIELD OF THE INVENTION

The invention relates to measuring cable travel sensors, and in particular, to cable travel sensors which operate on the basis of a measuring cable principle.

BACKGROUND OF THE INVENTION

Measuring cable travel sensors comprise a precisely defined and positioned cable drum on to which a measuring cable is wound, generally only in a single layer, and fixed at one end.

The other free end of the measuring cable is secured to the article of which the variation in the position is to be precisely measured.

When the article moves in relative terms away from the cable drum of the measuring cable travel sensor, the angular movements of the measuring cable drum are converted into a precise travel length by means of a rotary angle sensor which is non-rotatably coupled to the measuring cable drum. A rotary torsion spring, which is operatively connected generally in coaxial relationship to the measuring cable drum, ensures that the measuring cable is wound on to the measuring cable drum when the article to be measured moves towards the cable drum.

Measuring cable travel sensors of this kind are used in various technical assemblies, for example, for determining the position of an elevator cabin in an elevator shaft for continuously monitoring the angular position of ailerons or control elevators and vertical rudders in aircraft or the like.

In order to achieve the desired level of measurement accuracy for such measuring cable travel sensors, it is necessary on one hand, to ensure absolute angular truth as between the measuring cable drum and the rotary angle sensor. This requires, inter alia, free unimpeded rotary movement of the measuring cable drum, under all operating conditions, as any impediment to the cable drum would grossly falsify the measurement result. In particular, rubbing of the cable drum against the housing, for example, as a consequence of a mechanical loading, thermal distortion of parts of the housing and so forth, must be avoided.

For this reason the housings of the measuring cable travel sensors have hitherto generally been composed of metal parts. Production using injection molding procedures with plastic material or light metal or alloy has hitherto scarcely been wide-spread by reason of the generally unsatisfactory degree of accuracy and the complicated co-operation of the individual components.

On the other hand the extent of use of measuring cable travel sensors of that kind can be increased in proportion to reduced manufacturing cost thereof and the enhanced universality of the design configuration for example of the means for securing the sensor with respect to a surrounding structure.

SUMMARY OF THE INVENTION

An object of the present invention is to provide a measuring cable travel sensor which is inexpensive to produce and which nonetheless functions precisely and which in particular permits a wide variety of possible ways of fixing same with respect to its surroundings.

A further object of the present invention is to provide a method of assembling such a sensor, which permits fast and thus inexpensive assembly of the sensor, thereby to reduce the manufacturing costs of a sensor of that kind in regard to their aspect which depends heavily on the amount of time involved in assembly of the sensor.

These objects are attained by the invention as set forth herein.

Advantageous features and configurations are further set forth in the appendant claims.

As will be apparent from the description hereinafter of a preferred embodiment of the invention the fact that the housing which encloses the mechanical internal space or cavity and which therefore accommodates the cable drum and the flat spiral spring has at least two and preferably four flat outside surfaces which are at a right angle to each other and on each side has one or preferably two mutually parallel outwardly open grooves which are each at the same spacing from the contact edges of the outside surfaces means that the housing and therewith the travel sensor can be fixed in the most widely varying orientations by means of the same clamping claws or brackets to a component of the surroundings, that is with the cable exit of the travel sensor parallel or perpendicular to the component supporting the travel sensor.

If the end faces of the housing also extend at a right angle to the outside surfaces bearing the grooves and screw means which are present in the corners of the housing which is not only rectangular but preferably square as viewed in the longitudinal direction terminate openly visibly in those end faces, then by arranging the nuts on the corresponding screws in corresponding hexagonal recesses in the end faces, it is possible to use nuts into which the corresponding screws which hold the housing together only partially penetrate from the one end, so that other screws are used from the other side, for fixing with respect to the surrounding structure. If then fixing with respect to the surrounding structure is implemented by means of a mounting angle member which, by virtue of arcuate or mutually parallel diagonal slots, permits variability in its angular positioning either with respect to the surrounding component or with respect to the sensor, the most widely varying mounting options can be implemented in a simple fashion.

The internal structure of the travel sensor is also so selected that on the one hand assembly is very simple and quick, while on the other hand production is possible using plastic injection molding, that is to say with the dimensional deviations which necessarily occur in that situation, both in manufacture and also in operational fitment of the sensor.

In that sense the housing which encloses the mechanical internal space for containing the flat spiral spring and the cable drum and which is in the form of a cuboidal portion with a smaller cuboidal portion fitted thereon, more specifically the cable fitment portion through which the cable extends outwardly from the housing in which the cable drum is rotatably disposed, does not as was hitherto conventionally the case comprise two housing portions in the form of half-shell portions, the plane of contact of which extends through the cable fitment portion.

Instead, the housing comprises one mounting plate which accommodates the flat shaped spring and which therefore involves a smaller extent in the longitudinal direction of the travel sensor, that is to say the axial direction of the rotary trunnion or journal of the rotary angle sensor, as already known hitherto, is a cup-shaped mounting plate which however is kept as small as possible in respect of its depth in the longitudinal direction so that this mounting plate, in regard to the cable fitment portion, just also involves a side wall of the latter, while the whole of the remainder of the cable fitment portion is a component part of the other mounting plate which is therefore of a substantially greater longitudinal extent.

Because of its greater axial extent in the longitudinal direction, that other mounting plate is precisely not cup-shaped, that is to say with a closed bottom, but is of such a configuration as to be open at both axial sides or ends. The outwardly directed end face is closed by a separate component which is connected non-rotatably to the rotary angle sensor. As the rotary angle sensor can also be a potentiometer, or pot, that separate component which carries the rotary angle sensor can also be referred to as the pot mounting plate member. This involves advantages in regard to manufacturing procedures, in terms of production tolerances, and also facilitates zero position adjustment of the rotary angle sensor.

In this connection, the screw means, disposed in the four corners of the two mounting plates, can be used in different ways relative to each other, by virtue of the selected radial spacing of the through openings provided for that purpose in the corners of the housing, with respect to the pot mounting plate member.

When using screws without an additional washer, the screw heads no longer project into the region of the pot mounting plate member and they serve exclusively for fixing the two mounting plates relative to each other. This is effected with two screw means which are disposed in diagonally mutually opposite relationship. The other two screw means, which are also disposed in diagonally mutually opposite relationship, are tightened with the interposition of a support washer which is of larger diameter, whereby the pot mounting plate member and therewith also the rotational position of the rotary angle sensor non-rotatably connected thereto is fixed in the desired angular position with respect to the mounting plate.

The pot mounting plate member itself is fixed on the rotary journal or trunnion of the rotary angle sensor not by means of a nut which bears against the end thereof and which acts by force-locking engagement, but rather a positively locking connection is afforded between that nut and the mounting plate by a suitable hexagonal recess in the face of the pot mounting plate member.

In the direction of the free end of the rotary trunnion or journal, the pot mounting plate member is followed by the cable drum which is screwed on the rotary trunnion or journal by means of radially acting clamping screws. In the present case, two clamping screws may be used, which include an angle of 120° between them, whereby play-free clamping of the cable drum on the rotary trunnion or journal is possible.

At its free end the rotary trunnion or journal is cut thereinto in the longitudinal direction by a slot to such an extent that the slot can serve directly for inserting and thus positively lockingly fixing the core or center of the flat spiral spring without requiring further aids such as a transverse rivet or the like.

The two parts are brought together after the flat spiral spring is fitted into the spring chamber provided for same in the pot-shaped mounting plate. In this operation, a bar or plate portion at the outer free end of the flat spiral spring is also pushed in the longitudinal direction over a pin or projection which is integrally provided for that purpose on the mounting plate, being therefore injection molded therewith. In this case the flat spiral spring is prefabricated in such a way that, after that fitting operation, the core or center portion of the flat spiral spring is not applied radially outwardly in the spring chamber but remains centrally within the spring, without any fixing.

In this way it is possible, after insertion of the spring, to press into the spring chamber at its end a sliding plate which also comprises plastic material, engaging into a special recess, and fix it in force-locking relationship therein. The force-locking engagement is achieved by an injection-molded burr or ridge which projects deliberately along the periphery of that round sliding plate, by virtue of the plane of contact of the mold halves for that sliding plate being disposed in the central radial plane of the sliding plate. The burr, which is very narrow in the longitudinal direction of the sliding plate, is deformed in the operation of pressing it into a corresponding recess in the mounting plate, to such an extent as to afford secure force-locking fixing in that mounting plate until the two preassembled mounting plates are screwed to each other.

In this respect it is necessary for the one mounting plate unit which includes the rotary trunnion or journal of the rotary angle sensor to be fitted with its projecting slotted free end through the central opening in the sliding plate of the other mounting plate, and there, without being able to see that location, for the slot of the rotary trunnion or journal to be latched into the core or center portion of the rotary spring. This purpose requires good radial pre-adjustment which is initially implemented by virtue of the dimensioning of the central opening in the sliding plate which is only immaterially larger than the diameter of the rotary trunnion or journal. When the components are further fitted together, a flange which projects concentrically in the axial direction on the one mounting plate, more specifically the cable drum mounting plate which is open at both ends, is involved as an additional radial fixing means, insofar as that flange engages into a corresponding recess in the other mounting plate. This radial guidance effect then also makes it possible without difficulty for the two mounting plates to be firstly rotated about the longitudinal axis several times relative to each other prior to screwing of the two mounting plates relative to each other, whereby the flat spiral spring which is accommodated in the housing and which is already non-rotatably connected to the rotary trunnion or pin can be tightened in the necessary fashion.

It is only thereafter that the mounting plates are screwed relative to each other by the above-described first two screw means, followed then by zero position fixing of the rotary angle sensor by suitably turning the pot mounting plate member with respect to the rest of the housing and tightening the other two screw means.

For fixing the measuring cable at its end secured to the cable drum, the cable drum itself, near to the one side flank thereof, has a tangential slot in its winding surface in order to permit the beginning of the measuring cable to pass therethrough in a direction which is as shallowly tangential as possible, while fixing in the internal cavity of the cable drum is effected by clamping a thicker metal tube portion on to the end of the cable, which is thicker than the slot in the winding surface of the cable drum.

The material used for the housing portions is preferably POM 30 or POM G30, that is a plastic material which contains a high proportion of microscopically small glass balls which afford optimum sliding properties with respect to that plastic material relative to the metal elements involved such as the flat spiral spring, the cable drum, the rotary trunnion or journal of the rotary angle sensor and the measuring cable.

As cable drums of different sizes, in particular with respect to diameter can be fitted within one and the same housing, depending on the specific situation of use involved, the cable exit opening in the end face of the cable fitment portion must also be disposed at different locations. For this purpose, no cable exit opening is provided when producing the housing by injection molding, but rather the cable exit opening is subsequently produced at the desired location by boring.

Therefore, as the arrangement does not involve a cable fitment portion constituted by a special, harder, more wear-resistant material than the material of the housing, an acceptably low level of wear of the cable exit opening requires optimum frictional pairing with respect to the measuring cable, as an important consideration. It has been found in this respect that, with housing dimensions of about 3 cm×3 cm×3 cm for the main body of the housing and with the cable fitment portion projecting with respect thereto by about 1 cm and with 10 turns of the measuring cable on the measuring cable drum in mutually juxtaposed relationship in a single layer, a measuring cable of a thickness of between 0.4 and 0.6 mm is the optimum, in particular if that measuring cable comprises either a central wire or strand with between about 15 and 20 twisted strands surrounding it, or 7 strand portions which are twisted relative to each other, one thereof possibly being a central strand, wherein each of the strand portions is in turn produced from between 5 and 8 individual strands in twisted configuration.

It has also been found that the projection distance of the cable fitment portion can be optimized. More specifically, the radial spacing of the cable exit opening with respect to the winding surface of the cable drum can be optimized. In addition, the spring used is a flat shaped spring whose spring characteristic in the working range in which unwinding of the spring is possible extends in a linearly rising configuration.

In the inner end region of the spring characteristic, that is to say upon unwinding of the innermost turns of the flat shaped spring, which is not at all possible by virtue of the limited measuring cable length, in contrast an irregular and steeper configuration for the spring characteristic is acceptable.

In order to prevent unauthorized persons from opening the sensor and in order thereby to avoid possible injury due to the flat shaped spring jumping out, the assembly additionally uses vandal-proof screws, for example socket head screws, slotted screws or cross-slotted screws which cannot be opened with a normal tool because a projection sticks up in the center of the socket opening in the head of the screw, and that means that it is not possible to use a normal wrench for a socket head screw but only a special wrench with a central opening for receiving the projection. The same design configurations are also possible for dealing with cross-slotted screws and normal slotted screws.

For the same reason, the face of the sensor housing, which is remote from the rotary angle sensor, is not primarily intended for fixing the travel sensor, but generally remains free, and is therefore provided with a raised or recessed labelling, which is already formed in the injection molding operation, as a warning against unauthorized opening of the sensor, which is highly recommended for reasons relating to legal liability.

An eye at the free end of the measuring cable is injection molded on to the cable, pressed thereonto or knotted thereto, and preferably comprises high-quality steel, copper or a copper nickel compound.

In addition to the housing which encloses the mechanical internal space, it is possible to fit on to the face from which the rotary angle sensor projects a further cup-shaped housing attachment portion which encloses and protects the rotary angle sensor and in which a circuit board with an electronic evaluation system for the sensor is additionally disposed.

This housing attachment portion can again comprise the same plastic material and can also be produced by injection molding, or, if EMV-security is required, it can be produced from aluminum by extrusion or it can be produced in the form of an aluminum-coated plastic component.

Further objects, features and advantages of the invention will be apparent from the description hereinafter of a preferred embodiment of the invention.

BRIEF DESCRIPTION OF THE DRAWINGS

FIGS. 9a through 9e show different mounting angle members.

DETAILED DESCRIPTION OF THE DRAWINGS

Figure 1A:
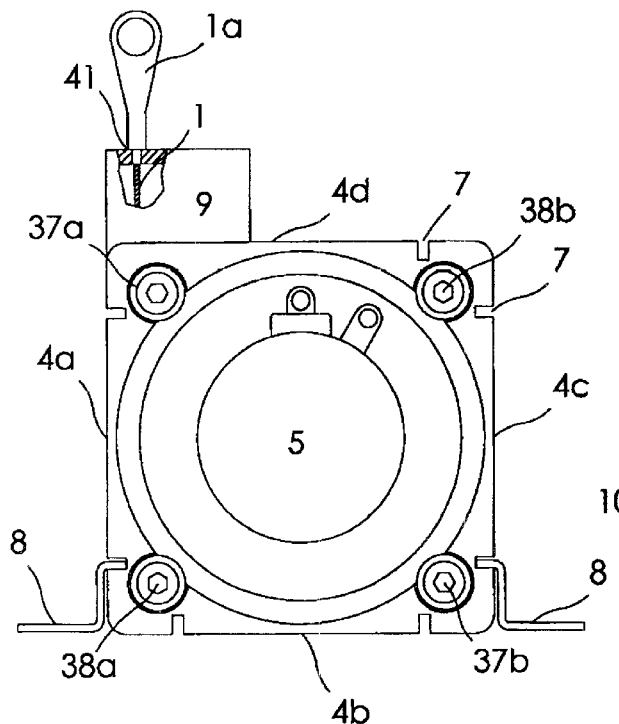
FIGS. 1a through 1c show different views of the travel sensor in the finished assembled condition.
Figure 1C:
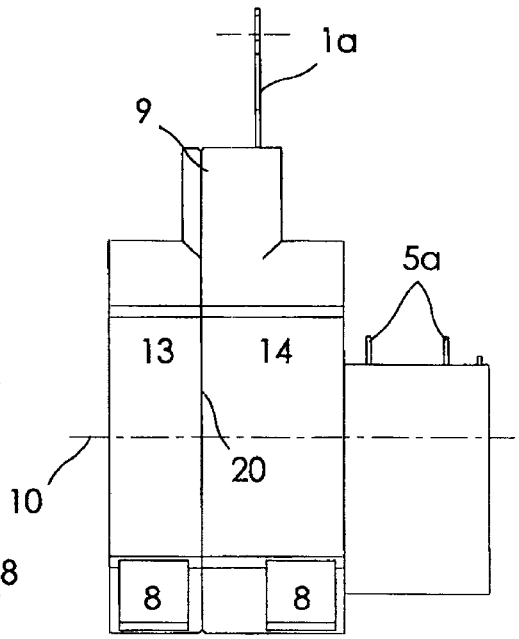
Figure 1B:
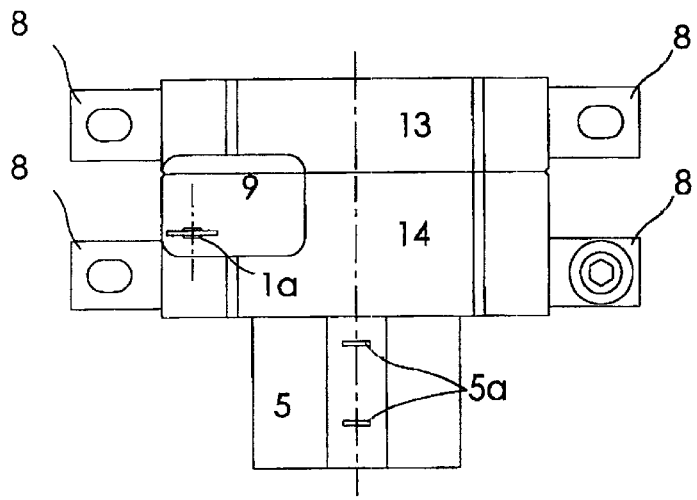

Referring to FIGS. 1a through 1c, a finished assembled measuring cable travel sensor in which a rotary angle sensor 5 is freely projecting and not covered is shown. The travel sensor includes a housing which encloses a space referred to as a mechanical internal space. The housing comprises a main portion which is rectangular and which, as viewed in a longitudinal direction 10 in FIG. 1c, is square, wherein one outside surface thereof is adjoined by a cable fitment portion 9 which is also square but markedly smaller and which has an aligned outside surface with an outside surface 4a which is parallel to the longitudinal direction 10.

In this respect, a preferred series of structural sizes for the sensors is one in which an overall length A of the housing, that is to say the extent of the outside surface 4a of the main housing portion tangentially with respect to the longitudinal direction 10 together with the extent of the adjoining cable fitment portion 9 in turn represents the extent of the outside surface 4a alone of the next size of housing.

Figure 2:
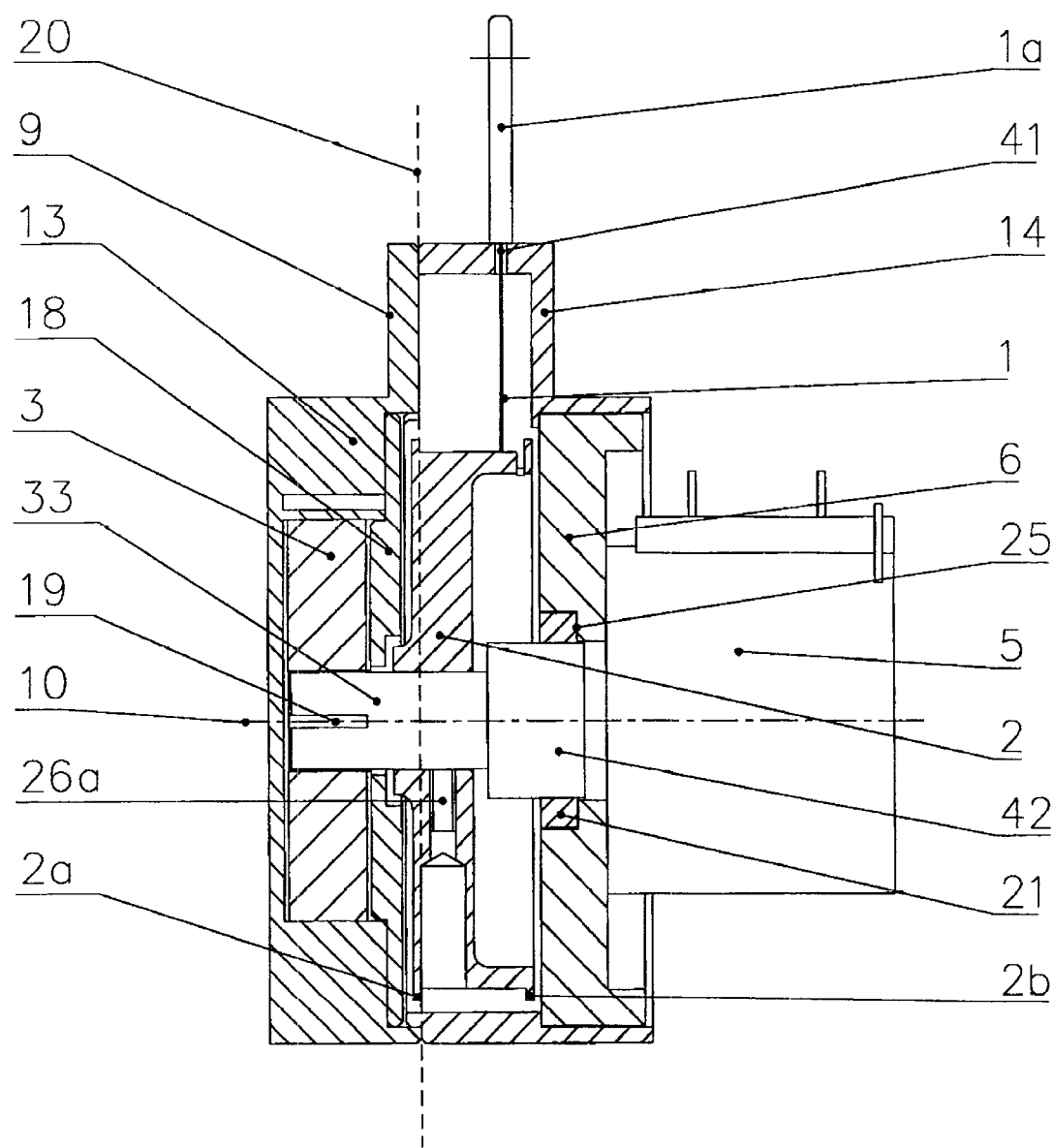
FIG. 2 is a view in section of the sensor of FIG. 1, FIGS. 3a through 3d show detail views of the one mounting plate.
Figure 4A:
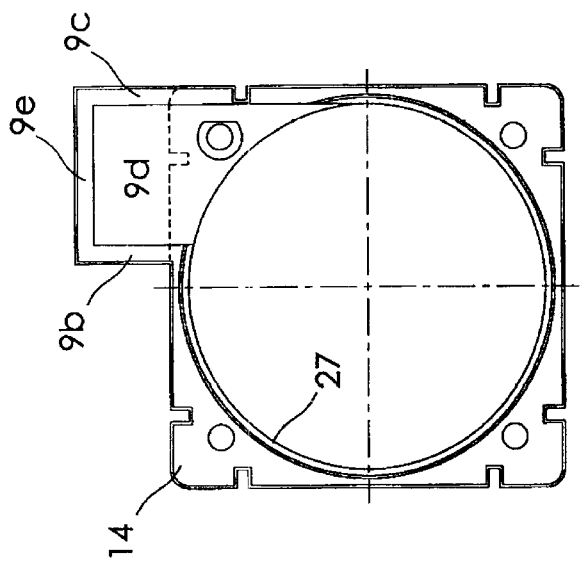
FIGS. 4a through 4d show the other mounting plate in detail.
Figure 4B:
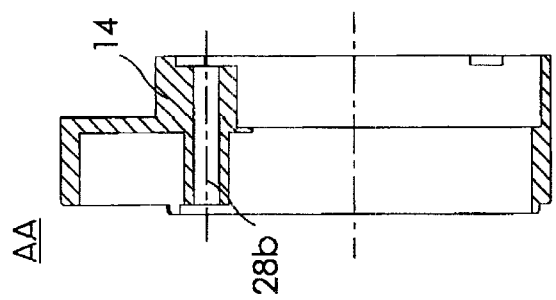
Figure 4C:
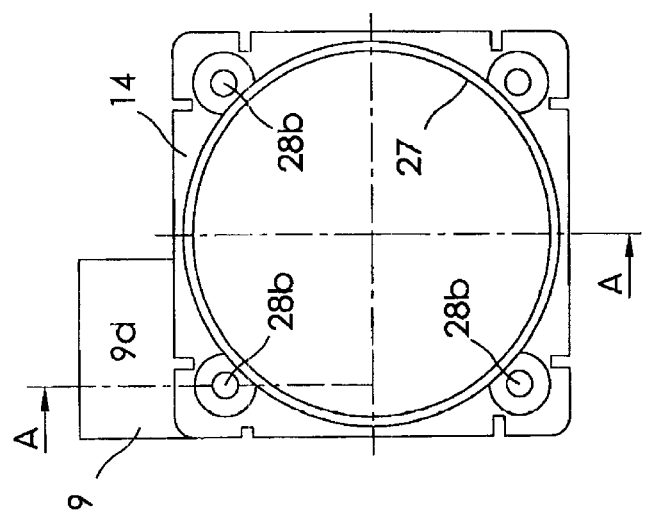
Figure 4D:
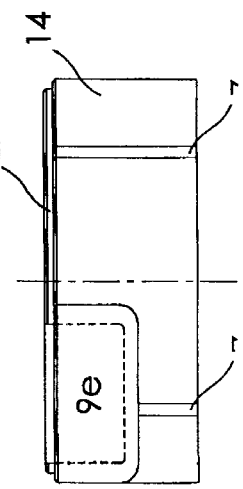

As FIGS. 1a through 1c show, disposed in an outwardly directed end face of the cable fitment portion 9 is the cable exit opening 41 through which the measuring cable 1 extends from an externally disposed eye 1a of the measuring cable 1 inwardly to the cable drum 2 which can be seen in FIG. 2.

FIGS. 1a through 1c also show that provided in the outside surfaces 4a, 4b, 4c, which extend parallel to the longitudinal direction 10 and which do not have the cable fitment portion 9, are two outwardly open grooves 7 extending in the longitudinal direction 10 in such a way that they are always at the same spacing from the edges of the main portion of the housing, which also extend in the longitudinal direction 10.

The outside surface 4d which carries the cable fitment portion 9 has only one such groove 7 on the side remote from the cable fitment portion 9.

The housing of the travel sensor can be screwed by means of those grooves 7 to any supporting component by means of Z-shaped claws or brackets 8 which are each cranked through 90°. The cranked configuration of the claws or brackets 8 corresponds to the spacing of the grooves 7 from the nearest edge. In this case, the claws or brackets 8 engage with their one free end into the groove 7 while the other free end is screwed to the supporting component.

This makes it possible to provide any desired arrangement, that is to say with the measuring cable 1 extending at a right angle or in parallel relationship, with respect to the supporting component.

It is also possible, as will be described in greater detail hereinafter, for the sensor to be fixed with respect to the surrounding structure by way of screw means 37a, 37b, 38a, 38b which terminate freely at their ends and which in the corners of the square housing connect together the two mounting plates 13, 14 of the housing. The rotary angle sensor 5 projects from the housing in the longitudinal direction 10 on the one face of the housing, more specifically the mounting plate 14.

The contact plane 20 between the cup-shaped mounting plate 13, which can be seen better in FIG. 2 and in which the flat spiral spring 3 is accommodated, and the mounting plate 14, which is open at both sides and in which the cable drum 2 and the pot mounting plate member 6 holding the rotary angle sensor 5 are accommodated, extends [in that arrangement] transversely and in particular at a right angle with respect to the longitudinal direction 10 and thus through the parts of the cable fitment portion 9 which are each formed in one piece with respective ones of the two mounting plates 13, 14. As a result, the internally hollow cable fitment portion 9 with one side wall thereof belongs to the mounting plate 13 which is narrower in the longitudinal direction 10, while with all the rest of the component parts thereof it belongs to the wider mounting plate 14.

The mounting plates 13, 14 are in the form of plastic injection moldings, like the other individual parts made of plastic material, the sliding plate 18 and the mounting plate member 6.

Reference will be made to the sectional view in FIG. 2 and the following detail views to describe in greater detail the procedure involved in assembling the sensor and the details of the respective components involved.

The two mounting plates 13 and 14 are respectively provided with the relevant components including the mounting plate 14 having the mounting plate member 6 screwed to the rotary angle sensor 5.

As FIG. 2 shows, the rotary angle sensor 5 has a projecting rotary trunnion or journal 33 of round cross-section, the body of the rotary angle sensor 5 being provided with a male screwthread 42, while at its free end it is provided with a slot 19 which extends in the longitudinal direction and which is open to the end and to the sides, with the depth of the slot 19 corresponding at least to the width of the flat spiral spring 3.

Figure 5B:
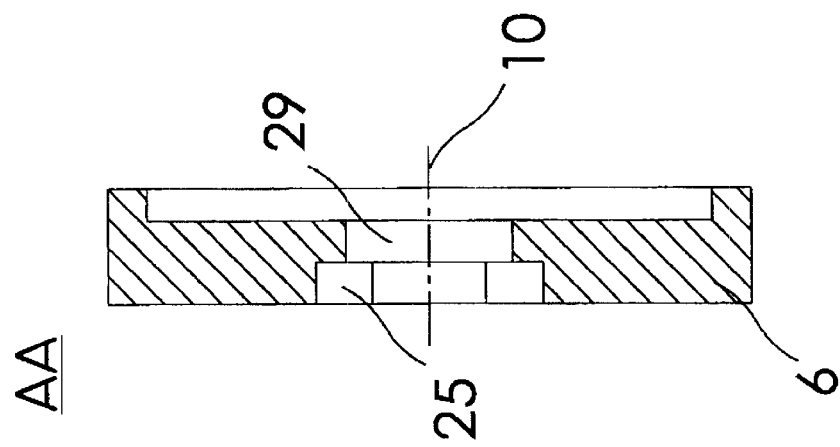
FIGS. 5a and 5b show the pot mounting plate member.
Figure 5A:
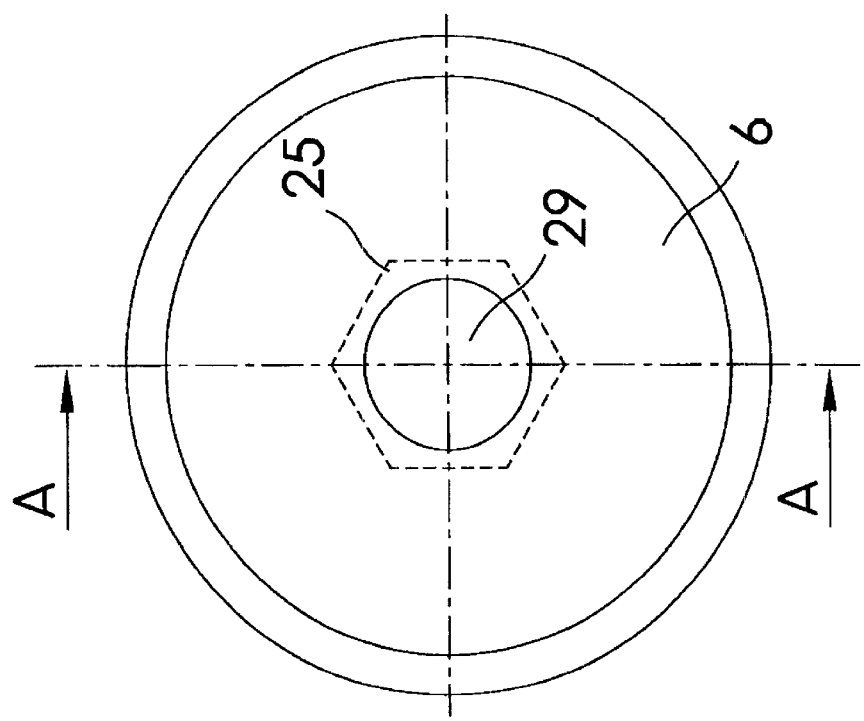

The mounting plate member 6, which is shown in detail in FIGS. 5a and 5b, has a round outside diameter and a central round through opening 29 which is somewhat larger than the outside diameter of the male screwthread 42 on the rotary trunnion or journal 33.

In cross-section, the mounting plate member 6 is of a slightly cup-shaped configuration, with a recess in its face and thus an axial extent which is increased at its rim, in the longitudinal direction 10.

Provided in the mounting plate member 6 on the oppositely disposed flat face which is away from the cup-shaped recess is a central hexagonal recess 25 of such a size that an inlay or insert nut indicated at 21 in FIG. 2 fits precisely therein. The nut 21 fits with its female screwthread on to the male screwthread 42 on the rotary trunnion or journal 33. In this way, the rotary angle sensor 5 can be pushed with the free end of its rotary trunnion or journal 33 leading, from the face of the mounting plate member 6, which is recessed in a cup-like configuration, through the central opening 29 in the mounting plate member 6, and thus screwed with the nut 21 which is fitted into the hexagonal recess 25, until the rotary angle sensor 5 and the pot mounting plate member 6 are connected together firmly in force-locking relationship both in the axial and radial directions.

Figure 6A:
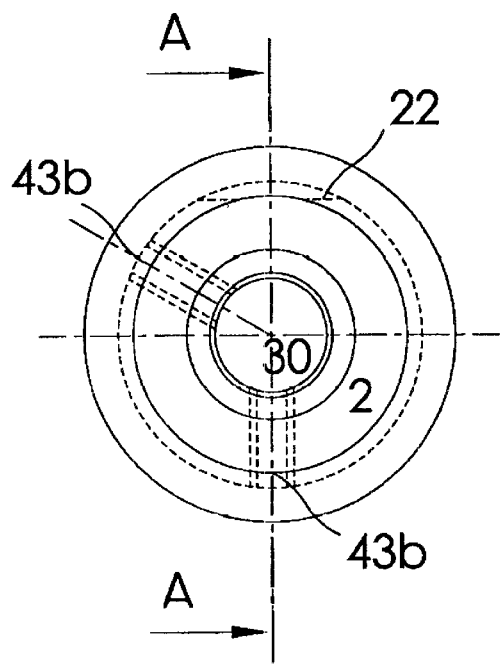
FIGS. 6a through 6c show the cable drum.
Figure 6C:
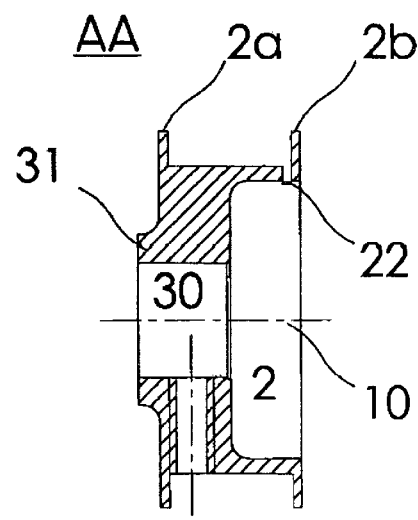
Figure 6B:
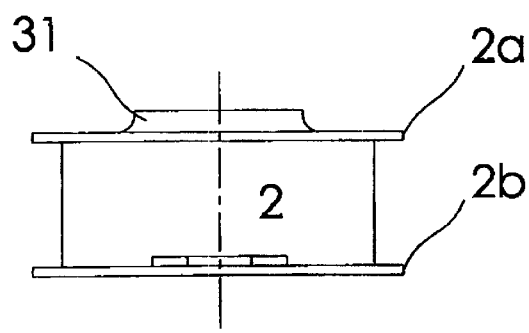

The cable drum 2, which is shown in detail in FIGS. 6a through 6c, is then pushed on to the free end of the rotary trunnion or journal 33.

As can be clearly seen from the view in longitudinal section in FIG. 6c, the cable drum 2 is also of a cup-shaped configuration having a central round through opening 30 for being pushed on to the rotary trunnion or journal 33 and a radially further outwardly disposed winding surface which is coaxial with respect to the opening 30, for winding on the measuring cable 2. Flanks 2a, 2b additionally extend radially outwardly in an annular configuration around the cable drum at the axial ends of the winding surface, in order to prevent the turns of cable 1 from falling off.

An annular projection 31 additionally extends in the axial longitudinal direction 10 in a direction beyond the winding surface, while the oppositely disposed half of the axial extent in the center of the winding drum is free.

Extending through the wall part of the radial portion between the winding surface and the through opening 30, near the one axial end of the cable drum, from the winding surface, in mutually displaced relationship, are respective radially extending screwthreaded bores shown at 43b in FIG. 6a, which extend into the opening 30, for screwing in grub screws as clamping screws shown at 26a, 26b in FIG. 2 for clamping the cable drum 2 on the rotary trunnion or journal 33 in a position in which the cable drum 2 is only still slightly spaced from the mounting plate member 6 in the axial direction 10.

Looking again at FIG. 6c, in the axially oppositely disposed end region, milled into the winding surface of the cable drum 2 is a tangential slot 22 which passes through the winding surface and which serves for introduction of the inwardly disposed end of the measuring cable 1 into the hollow interior of the cable drum 2.

The unit which is formed in this way and which consists of the rotary angle sensor 5, the mounting plate member 6 and the cable drum 2 together with the measuring cable 1 is now inserted, with the free end of the rotary trunnion or journal 33 leading, from the outside at the face into the mounting plate 14 which is open at both sides, until the pot mounting plate member 6 is seated in the inner recess which is provided for that purpose and which is also circular, in the mounting plate 14. In that position, the mounting plate member 6 terminates at the outside in the longitudinal direction approximately flush with the outside surface of the mounting plate 14.

In this respect, fitting of the measuring cable 1 can be effected by two different methods. In the first method, the eye 1a is pre-fixed on the measuring cable 1 at the outer end and the measuring cable 1 is threaded inwardly with the inner free end through the cable outlet opening 41 in the cable fitment portion 9 and then passed into the interior of the cable drum 2 through the slot 22 in the cable drum 2 while it has not yet been fitted on to the rotary trunnion or journal 33, and increased in size in the interior of the cable drum 2 by means of fitting a clamping sleeve to the measuring cable, so that the inner end can no longer be pulled back through the slot.

The other option provides that the clamping sleeve is already fitted to the inner end of the measuring cable 1 and the measuring cable 1 is passed through the slot 22 in the cable drum 2 and wound on the cable drum 2 when the cable drum 2 is mounted on the rotary trunnion or journal 33.

After the entire unit as defined above has been fitted into the mounting plate 14, the free outer end of the measuring cable 1 is then passed outwardly through the cable outlet opening 9 and clamped there to an eye 1a as the outer end thereof.

The mounting plate 14 which is open at both ends is shown in detail in FIGS. 4a through 4d. In that respect, it can be seen that the cable fitment portion 9 and the main part of the mounting plate 14 are formed together in one piece and define a common cavity which however is open at both sides only in its main part while the cable fitment portion 9 is closed at the end both in the longitudinal direction and also transversely with respect to the longitudinal direction.

FIGS. 4a through 4d also show an annular collar or flange 27 which projects at the face in the longitudinal direction towards the other mounting plate 13 and which extends almost completely around the round internal space and which is missing only in the region of the transition between the main part of the mounting plate 14 and the cable fitment portion 9.

The other mounting plate 13, which is shown in FIGS. 3a through 3d, differs in that it is closed in a cup-shaped configuration at its outer end. Furthermore, in the case of this mounting plate 13, only the one side wall 9a of the cable fitment portion 9 is present thereon, the side wall 9a being formed in one piece together with the mounting plate 13 adjoining the open side thereof, which is towards the mounting plate.

Shown in the plan view on to the open side in FIG. 3a is the central, substantially circular spring space or chamber 3', whose depth is equal to or somewhat greater than the width of the flat spiral spring 3, which is to be accommodated therein.

Disposed outside the circular main space or chamber at the periphery thereof is a recess in which a projection 17 having an aerofoil configuration in cross-section, as shown in FIG. 3a, projects in the longitudinal direction, from the bottom of the mounting plate 13 and being surrounded therein by a free space. The projection 17 serves for fitting thereon a fixing plate portion formed at the outer end of the flat spiral spring 3, the plate portion being bent to form a flat eye. No protruding projection or any other member for fixing the inner end of the flat spiral spring, which can be referred to as the core or center portion of the flat spiral spring, is provided at the center of the spring chamber 3'.

Figure 7B:
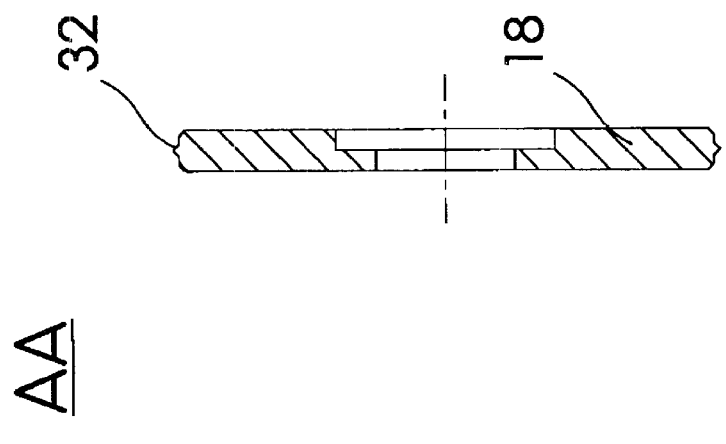
FIGS. 7a and 7b show the sliding plate.
Figure 7A:
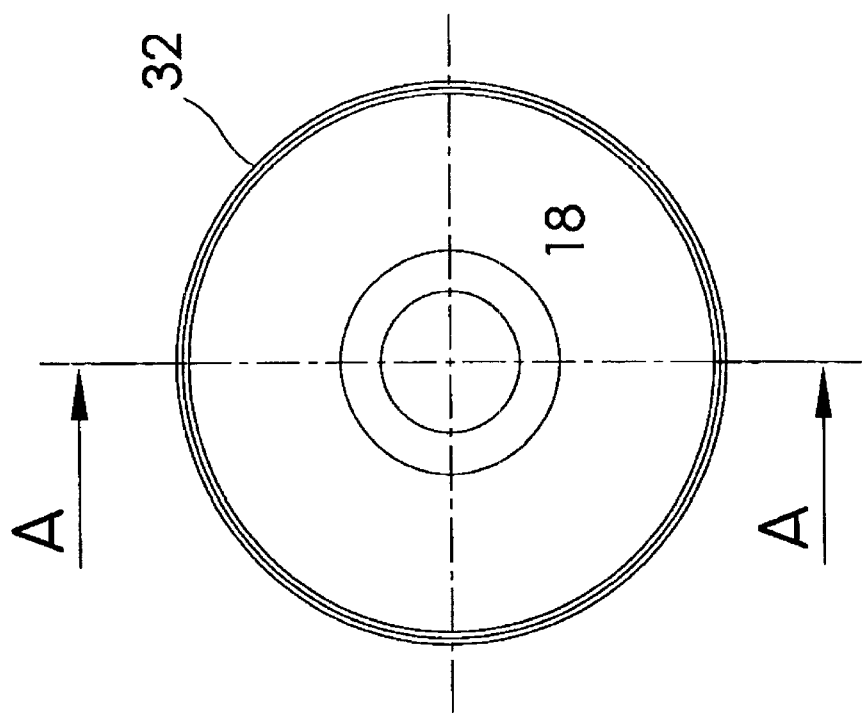

Near the open side, which is towards the right in FIG. 3c, the mounting plate 13 also has a second, also circular, recess 18' which is of larger diameter and which serves to receive a flat sliding plate indicated at 18 in FIG. 2 and shown in greater detail in FIGS. 7a and 7b, which is also of a circular shape.

As FIG. 3d shows, provided in the corner regions of the rectangular and preferably square main shape of the mounting plate 13 are once again the mouths of the through openings as indicated at 28a, 28b for the screw means for screwing the two mounting plates together. Those mouths, however, are surrounded in this mounting plate 13 by concentrically arranged hexagonal recesses 24 which serve to receive hexagonal nuts which are to be fitted on to the screw means and which can be non-rotatably received in the recesses 24.

The remainder of the outwardly facing closed face 4' of the mounting plate 13 is generally used for providing a raised or recessed durable warning label which warns against unauthorized opening of the housing, in consideration of the prestressed spring which is to be found therein.

This side of the housing, which is the left-hand side in FIG. 2, is pre-assembled by a procedure whereby the wound-up flat spiral spring 3, whose outside diameter in the pre-wound condition is equal to or smaller than the diameter of the spring chamber 3', is fitted into the open end of the mounting plate 13 in the longitudinal direction 10 and the connecting plate portion at the outer end of the flat spiral spring is pushed over the projection 17.

In this case, the flat spiral spring 3 is pre-bent or pre-wound in such a way that, after the spring 3 has been fitted in place, the core or central portion 16 of the flat spiral spring is automatically at the center of the spring chamber 3', as indicated in FIG. 3a.

Then, the circular flat sliding plate 18, which is shown in FIGS. 7a and 7b, is pressed into the recess 18' which is provided for it in the mounting plate 13 and clamped therein. The clamping effect is achieved by virtue of the fact that the sliding plate 18 has a ridge or burr 32 which can be clearly seen in FIG. 7b and which is narrow in the longitudinal direction, extending around the sliding plate 18 radially outwardly thereon.

The burr 32 is formed in the process for injection molding of the sliding plate 18, insofar as it is at that location that the contact plane between the two mold halves by which the sliding plate 18 is molded is disposed. By virtue of the small cross-sectional size of the burr 32, it is squashed between the inside wall of the recess 18' and the outside peripheral surface of the remainder of the sliding plate 18, when the sliding plate 18 is being pushed into the recess 18'. The burr 32 thus serves for fixing the sliding plate 18 in position in force-locking relationship.

The sliding plate 18 also has a central through opening with a larger recess or step concentrically surrounding it. The central opening is slightly larger than the diameter of the rotary trunnion or journal 33.

The sliding plate 18 is fitted into the mounting plate 13 in such a way that, as shown in FIG. 2, the surrounding larger step or recess in the sliding plate 18 faces outwardly, towards the other mounting plate 14, and can receive the annular projection portion 31 of the cable drum, which thus serves as a support in relation to the sliding plate 18 which acts as a wearing member, and also radially fixes it.

The pre-assembled mounting plate 14 is therefore pushed with the free end of its rotary trunnion or journal 33 leading through the central through opening in the sliding plate 18 into the spring chamber 3' of the mounting plate 13 and in so doing is rotated until the transverse bar portion of the core, disposed therein, of the flat spiral spring 3 slides into the slot 19 at the free end of the rotary trunnion or journal 33. Thus the flat spiral spring 3 and the rotary trunnion or journal 33 are non-rotatably connected together.

When the components are further pushed one into the other, the annular collar 27 of the mounting plate 14 is also introduced into a corresponding annular internal step of the mounting plate 13 so that, when the mounting plates 13 and 14 bear against each other, they can be rotated a number of times relative to each other about the longitudinal direction 10 until the flat spiral spring 3 has been tightened by the desired number of revolutions. In order to secure this condition, the two mounting plates 13, 14 are pressed axially against each other in the correct rotational position by screws which are passed through two diagonally opposite ones of the four through openings 28a, 28b and fixed by means of nuts fitted on the opposite side.

Screws are fitted through the two remaining through openings 28a, 28b with washers 39 of larger diameter being disposed under the heads of those screws, on the side of the mounting plate 14. In this respect, the diameter of the washers 39 is so great that, as can best be seen from FIG. 4a, these washers project into the central free space of the mounting plate 14 and thus engage radially inwardly somewhat over the outer edge of the pot mounting plate member 6 disposed therein.

The rotary angle sensor 5 together with the pot mounting plate member 6 which is non-rotatably connected thereto is now rotated until the electronic evaluation system connected to the rotary angle sensor 5 produces a zero signal in the desired zero position, in regard to the component to be monitored which is secured to the eye 1a of the measuring cable. Now, in this rotational position of the pot mounting plate member 6 with respect to the mounting plate 14, the screws which have the washers 39 therebeneath are tightened, thereby setting the zero position of the sensor.

For the purpose of adjusting the zero position, it is only necessary for the two screws, which have the washers 39 therebeneath and which are thus clearly perceptible, to be loosened somewhat again. The fact that the washers are clearly visible means that there is no risk of accidentally opening the housing by undoing the wrong screws.

If, in individual cases, the travel sensor is to be mounted with its face 4' of the mounting plate 13 to a surrounding component, for example an intervening mounting angle member, then longer hexagonal nuts are used in the recesses 24 on that side than would be necessary for screwing in the ends of the through screws. The remaining female screwthread length of the longer hexagonal nuts then serves for screwing in fixing screws from the opposite side, by which the sensor can be fixed to a supporting component.

Figure 8B:
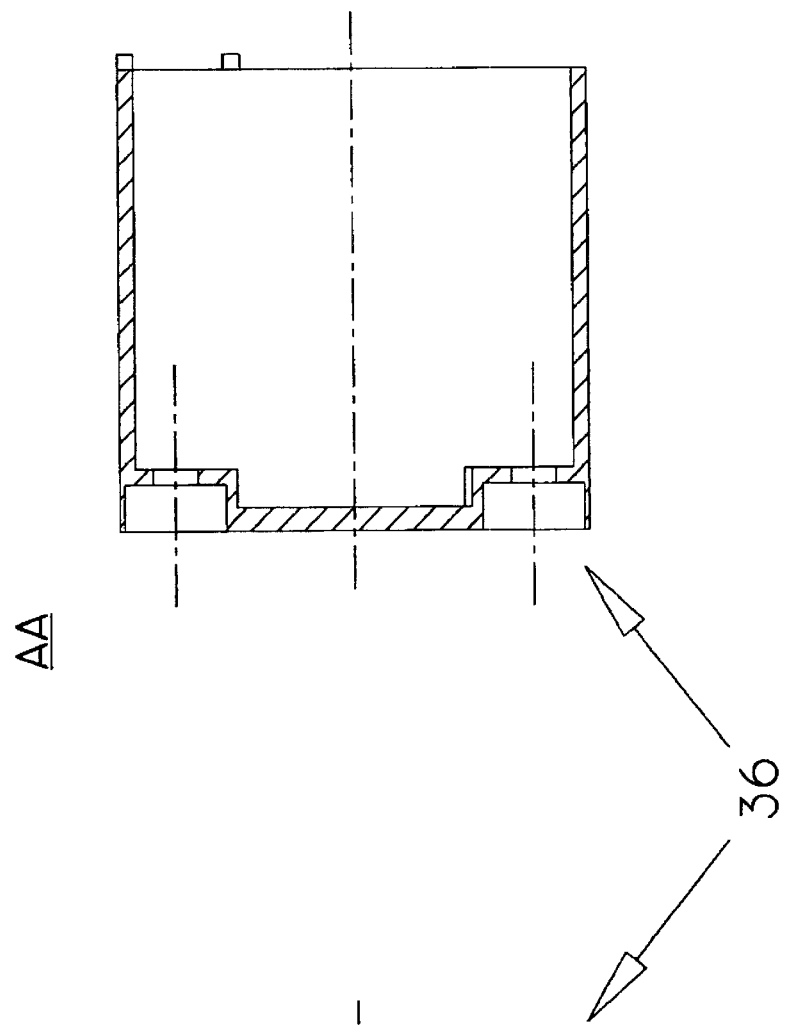
FIGS. 8a and 8b show the housing attachment portion.
Figure 8A:
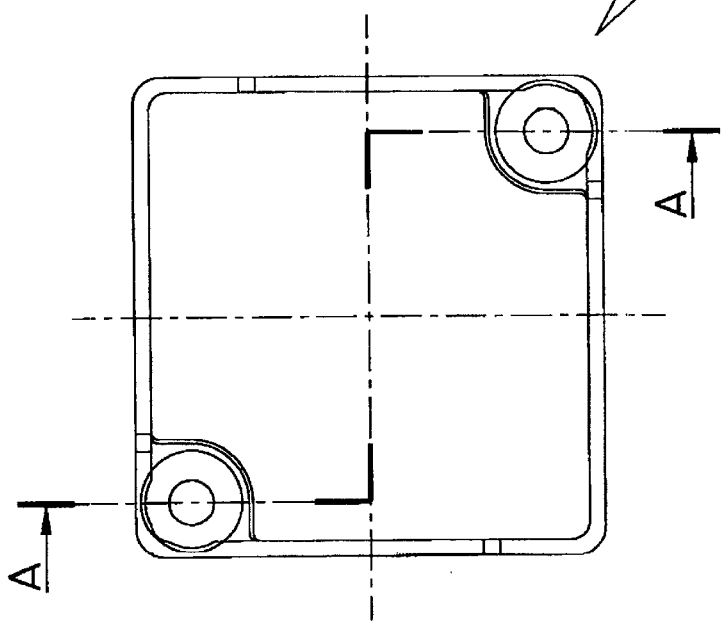

The rotary angle sensor 5 can be protected on the opposite side, that is on the mounting plate 14, by an additional housing fitment, as shown at 36 in FIGS. 8a and 8b. The additional housing fitment is in the form of a cap which is preferably also of a rectangular or square cross-section when considered in the longitudinal direction, similar to the main part of the mounting plate 13, 14. Such a housing fitment 36 is shown in FIG. 8 and is already fitted at the end on the outside to the mounting plate 14 prior to the operation of screwing the mounting plates 13, 14 in place and is also screwed in position there by the use of correspondingly longer screws. For this purpose in particular, headless screwthreaded pins or studs are used, on to which nuts can be fitted at both ends. Corresponding through openings are provided in the housing fitment 36, preferably only at two mutually diagonally opposite corners, that is, corresponding to the positions which serve only for screwing the mounting plates 13, 14 in position.

Mounting angle members 40, as shown in FIGS. 9a through 9e, can serve for face screwing of the travel sensor in position. In this case, a limb 40a which is towards the travel sensor preferably has part-circular slots as shown in FIG. 9a which are arranged along a circular arc and through which the screws which extend into the through openings 28a, 28b are also intended to extend so that stepless adjustability of the sensor is possible with respect to that limb 40a, at any desired angle.

The other limb 40b, which is preferably at an angle of 90° relative to the first limb 40a, also preferably has slots 44a, 44b for screwing with respect to a supporting component.

As shown in FIG. 9c, there are two slots 44a, 44b which extend at a right angle relative to the connecting edge between the limbs 40a and 40b.

As shown in FIG. 9d, there are two part-circular slots 40'a, 40'b which are arranged on a circular arc in order to be able to turn a screw mounting by means of two screws in respect of the angle relative to the supporting component.

As shown in FIG. 9f, there are four slots 44"a, 44"b, 44"c, 44"d, of which two extend at a right angle relative to the connecting edge between the limbs and the other two extend parallel thereto in order to be able to compensate for lengths by means of suitable screwing in both directions.

As shown in FIG. 9a the corresponding slots 44'''a, 44'''b are respectively arranged parallel to each other, while being arranged diagonally, preferably at a 45° angle, with respect to the connecting edge between the limbs 40a and 40b.

What is claimed is:

1. A measuring cable travel sensor comprising:
   a housing forming at least one internal space;
   a cable drum disposed in the at least one internal space and operatively arranged to be rotatably supported by the housing to allow winding and unwinding of a measuring cable onto the cable drum;
   a flat spiral spring non-rotatably disposed in the at least one internal space and arranged coaxially with the cable drum; and
   a rotary angle sensor operatively connected to the cable drum for sensing rotary movement thereof;
   wherein the housing comprises four outside surfaces which are adjoined and are disposed perpendicularly to one another, each of the outside surfaces including an open groove for fixing the housing of the sensor by way of claws arranged in the open grooves.

2. The measuring cable travel sensor according to claim 1, wherein the housing comprises a first cup-shaped mounting plate which supports the flat spiral spring and a second mounting plate which supports the cable drum and being configured to be open at each of its sides, the housing further comprising a sliding plate which is arranged at a transition between the first mounting plate and the second mounting plate and a pot mounting plate member being arranged as an external closure for the second mounting plate.

3. The measuring cable travel sensor according to claim 2, wherein the housing further comprises a cable fitment portion having side walls and an end wall having an opening through which the measuring cable extends into and out of the housing, wherein a plane of contact between the first and second mounting plates extends through the cable fitment portion, the contact plane being arranged such that one of the mounting plates forms one of the side walls of the cable fitment portion and the other mounting plate forms the other side walls and the end wall of the cable fitment portion.

4. The measuring cable travel sensor according to claim 2, wherein the first and second mounting plates are made of plastic material.

5. The measuring cable travel sensor according to claim 4, wherein the plastic material is POM 30.

6. The measuring cable travel sensor according to claim 2, wherein the pot mounting plate member has a recess for non-rotatably accommodating an insert nut on a side remote from the rotary angle sensor.

7. The measuring cable travel sensor according to claim 6, wherein the recess is hexagonal.

8. The measuring cable travel sensor according to claim 2, wherein the first and second mounting plates each include four corners with each corner having through bores for screws, wherein two diagonally opposed screws operate to screw the first and second mounting plates together and the other two screws serve to clamp the pot mounting plate member in a defined rotational position with respect to the second mounting plate by way of washers disposed under screw heads whose diameters are larger than the screw heads.

9. The measuring cable travel sensor according to claim 1, wherein the rotary angle sensor includes a rotary trunnion extending in a longitudinal direction of the sensor toward the spiral spring, the rotary trunnion including a longitudinally extending slot in a free end, wherein the spiral spring has a core portion which is non-rotatably arranged over the slot.

10. The measuring cable travel sensor according to claim 9, wherein a first mounting plate includes a projection in a location outside an area accommodating the spiral spring, the projection extending in the longitudinal direction of the first mounting plate, wherein the spiral spring has an outer end providing a bar portion formed by bending over through approximately 180° for fitted axially onto the projection.

11. The measuring cable travel sensor according to claim 9, wherein the spiral spring is configured such that when in a wound but non-prestressed condition in the first mounting plate, the core portion of the spiral spring is arranged at a center of the spiral spring.

12. The measuring cable travel sensor according to claim 1, wherein the cable drum comprises a winding surface and a tangentially extending slot which passes through the winding surface for the measuring cable.

13. The measuring cable travel sensor according to claim 1, wherein the housing comprises a first cup-shaped mounting plate which supports the flat spiral spring and a second mounting plate which supports the cable drum, the first cup-shaped mounting plate comprising an outside surface including through openings for screws, the through openings including mouths at an outside surface of the first cup-shaped mounting plate which include outwardly opening hexagonal recesses for non-rotatably receiving nuts therein.

14. A method of assembling a measuring cable travel sensor, the measuring cable travel sensor comprising a housing including first and second mounting plates and a pot mounting plate member which enclose at least one internal space, a cable drum and a sliding plate arranged in the at least one internal space, the cable drum arranged to allow the winding and unwinding of a measuring cable onto the cable drum, a rotary angle sensor having a rotary trunnion operatively connected to the cable drum for sensing the rotation thereof, a spiral spring arranged non-rotatably and coaxially on the rotary trunnion of the rotary angle sensor, the method comprising the acts of:

forming a pre-assembled unit by connecting together the cable drum, the pot mounting plate member and the rotary angle sensor;

threading a core portion of the spiral spring and the sliding plate onto a free end of the rotary trunnion of the rotary angle sensor, the free end of the rotary trunnion having a slot formed therein over which the core portion is threaded;

fitting the first mounting plate onto the free end of the rotary trunnion of the rotary angle sensor such that the free end projects into the first mounting plate and the first and second mounting plates bear against each other;

rotating the first and second mounting plates relative to one another to set the stressing of the spiral spring;

screwing the first and second mounting plates to one another in a longitudinal direction of the sensor by way of diagonally opposed screws, wherein two other oppositely disposed screws are disposed on the side of the pot mounting plate member and include washers; and adjusting a zero position of an electronic evaluation system by rotating the rotary angle sensor and the pot mounting plate member relative to the second mounting plate and then tightening the two other oppositely disposed screws in an adjusted position.

15. The method of assembling a measuring cable travel sensor according to claim 14, wherein the housing includes a cable fitment portion having an opening for guiding the measuring cable therethrough, the location of the opening being dependent on the diameter of the cable drum.

16. The method of assembling a measuring cable travel sensor according to claim 14, wherein a plurality of the components of the measuring cable travel sensor are made from a plastic material by injection molding in a single injection molding step without the formation of a single mold cavity.

17. The method of assembling a measuring cable travel sensor according to claim 16, wherein the components include the first and second mounting plates, the pot mounting plate member and the sliding plate.

18. A method of assembling a measuring cable travel sensor, the measuring cable travel sensor comprising a housing including first and second mounting plates and a pot mounting plate member which enclose at least one internal space, a cable drum and a sliding plate arranged in the at least one internal space, the cable drum arranged to allow the winding and unwinding of a measuring cable onto the cable drum, a rotary angle sensor having a rotary trunnion operatively connected to the cable drum for sensing the rotation thereof, a spiral spring arranged non-rotatably and coaxially on the rotary trunnion of the rotary angle sensor, the method comprising the acts of:

forming a pre-assembled unit by:
inserting a nut into a corresponding recess in the pot mounting plate member;
inserting the rotary trunnion of the rotary angle sensor through the pot mounting plate member and screwing the nut onto a male screwthread of the rotary trunnion; and
pushing the cable drum onto the rotary trunnion from the free end of the rotary trunnion toward the pot mounting plate member and clamping the cable drum onto the rotary trunnion by a radial clamping screw;

inserting the pre-assembled unit comprising the cable drum, the pot mounting plate member and the rotary angle sensor into the second mounting plate which is open at both sides;

inserting the spiral spring into the first mounting plate which has a cup-shaped configuration, a fixing portion of an outer end of the spiral spring being pushed onto a corresponding projection of the first mounting plate, the projection protruding in a longitudinal direction of the assembly;

pressing the sliding plate into the opening of the first mounting plate;

fitting the first mounting plate onto the free end of the rotary trunnion of the rotary angle sensor such that the free end projects into the first mounting plate and the first and second mounting plates bear against each other;

rotating the first and second mounting plates relative to one another to set the stressing of the spiral spring;

screwing the first and second mounting plates to one another in a longitudinal direction of the sensor by way of diagonally opposed screws, wherein two other oppositely disposed screws are disposed on the side of the pot mounting plate member and include washers; and adjusting a zero position of an electronic evaluation system by rotating the rotary angle sensor and the pot mounting plate member relative to the second mounting plate and then tightening the two other oppositely disposed screws in an adjusted position.

* * * * *